No. 614,840.　　　　　　　　　　　　　　　　　Patented Nov. 29, 1898.
J. B. CONDE.
MACHINE FOR MAKING VIALS, &c.
(Application filed Dec. 9, 1893.)

(No Model.)　　　　　　　　　　　　　　　　　　　　　6 Sheets—Sheet 1.

Witnesses:　　　　　　　　　　　　　　　　　　　　Inventor.

No. 614,840. Patented Nov. 29, 1898.
J. B. CONDE.
MACHINE FOR MAKING VIALS, &c.
(Application filed Dec. 9, 1893.)
(No Model.) 6 Sheets—Sheet 3.

Witnesses: Inventor.

No. 614,840.  
J. B. CONDE.  
MACHINE FOR MAKING VIALS, &c.  
(Application filed Dec. 9, 1893.)  
Patented Nov. 29, 1898.

(No Model.) 6 Sheets—Sheet 4.

Witnesses:  
Jesse B. Heller  
Ira S. Heller

Inventor.  
James B. Conde,  
per John R. Nolan  
Attorney.

No. 614,840. Patented Nov. 29, 1898.
J. B. CONDE.
MACHINE FOR MAKING VIALS, &c.
(Application filed Dec. 9, 1893.)
(No Model.) 6 Sheets—Sheet 5.

Witnesses:
Jesse B. Aeller
Ira S. Heller

Inventor.
James B. Conde
per John F. Nolan
Attorney.

No. 614,840. Patented Nov. 29, 1898.
J. B. CONDE.
MACHINE FOR MAKING VIALS, &c.
(Application filed Dec. 9, 1893.)
(No Model.) 6 Sheets—Sheet 6.

Witnesses: Inventor.

UNITED STATES PATENT OFFICE.

JAMES B. CONDE, OF CLIFTON HEIGHTS, PENNSYLVANIA.

MACHINE FOR MAKING VIALS, &c.

SPECIFICATION forming part of Letters Patent No. 614,840, dated November 29, 1898.

Application filed December 9, 1893. Serial No. 493,274. (No model.)

*To all whom it may concern:*

Be it known that I, JAMES B. CONDE, a subject of the Queen of Great Britain and Ireland, residing at Clifton Heights, in the county of Delaware and State of Pennsylvania, have invented certain new and useful Improvements in Machines for Making Vials, Syringes, &c., of which the following is a full, clear, and exact description, reference being had to the accompanying drawings, forming a part of this specification.

In the prior art of making glass vials, syringes, and other like tubular devices the operation as usually practiced has been a manual one, as follows: Glass tubes of predetermined diameter are procured and the same divided into sections of suitable length. The operator picks up each section individually and heats one end thereof to a high degree by means of blowpipes. He then takes a suitable hand-tool, provided with a plug and dies, and inserts the plug thereof in the heated end of the section, compresses the dies, and at the same time rotates the section or the section and the tool, the result being the formation of a lip and neck on the end of the section. This done, he heats and similarly forms the other end of the section, following which he divides the latter midway of its length, heats the severed ends thereof, and forms vial-bottoms or syringe-nozzles thereon, as required. Two vials or two syringes, as the case may be, are thus produced from each section. The object of my invention is to provide a mechanism whereby the heating of the section, the insertion of the plug therein, and the compression of the dies shall be effected automatically, which operations may be performed upon both ends of the section simultaneously and at the same time upon a plurality of sections, if desired.

To this end the invention comprises novel features of construction and organization of parts that will fully appear from the following description and claims, with reference to the annexed drawings, wherein the invention is illustrated in a form best calculated to demonstrate the generic points of improvement—that is to say:

Fig. 3 is a transverse vertical section as on the line *x x* of Fig. 1.

The numeral 1 represents the supporting-frame, and 2 a table or bench to which it is bolted or otherwise firmly secured. Mounted on this frame are two oppositely-disposed carriages 3, which are so constructed and arranged that they may be moved toward or away from each other in the same horizontal plane, as hereinafter described. In the present instance these carriages each comprise a pair of end heads 4, connected by a cross-bar 5 and fitted to suitable guides 6 in the upper edge of the respective side walls of the main frame. Each head is provided with a rack 7, with which engages a toothed sector or gear 8 on a transverse shaft 9, fitted to suitable bearings in the side walls, whereby the proper turning of said shaft will advance or retract the carriage. In order that the carriages may be actuated simultaneously, the ends of the respective shafts on one side of the machine are provided with lever-arms 10, that are connected by means of links 11 with a vertically-reciprocative cross-head 12, the latter being in turn connected with a normally-elevated treadle 12ª by means of a rod 13. Hence the act of depressing the treadle will effect the movement of the carriages toward each other. The treadle is held normally elevated by means of a strong retracting-spring 14 secured thereto and to an adjacent part of the table. Thus when the pressure is removed from the treadle the latter is retracted to its normal position to insure the return of the carriages. As the devices upon the two carriages aside from their opposite positions are identical in construction and operation, a detailed description of one set of devices will suffice.

On the front of each carriage is a transverse bar 15, from the face of which projects a series of tapering plugs 16, that are disposed at regular intervals apart in the same horizontal plane. In this instance for purposes of illustration four plugs are shown; but of course a greater or less number may be employed, as occasion may require, without affecting the principle of the invention. In fact, if desired, a single plug may be used. The plug-supporting bar 15 is bolted to a bar 17, which is formed on or secured to brackets 18, that are in turn fastened to the cross-bar 5 of the carriage. The bolt-holes 19 in the bar 17 are elongated vertically, so that the bar 15, with its plugs, may be nicely adjusted. On the front of the carriage are disposed two vertically-reciprocative transverse dies 20 21, one, 20, being above and the other, 21, below the series of plugs, which dies are adapted to be moved simultaneously toward or away from said plugs. In the present case the dies comprise a couple of bars secured to back bars 22, which really form part of the dies, the ends of which back bars are fitted to vertical guides 23 in the respective sides of the carriage. The upper bar is provided near its ends with lugs or brackets 24, to each of which is secured, preferably adjustably, the upper end of a rod 25, the lower end of which passes through a perforated guide-lug 26 on the inner face of the adjacent side wall of the carriage and rests upon the outer arm of a small rocking lever 27, that is pivoted to a depending lug on said side wall. There are thus two rocking levers on each carriage. The upper ends of the rods 25 are screw-threaded and fitted to correspondingly-threaded holes in the lugs or brackets 24, whereby the vertical adjustment of the die may be effected. The rods are provided with jam-nuts 28, by which the parts may be locked in their positions of adjustment. The lower die 21 is provided near its ends, respectively, with depending pins 29, that rest upon the inner arms of the adjacent rocking levers. Hence if the upper die be depressed the rods bearing upon the rocking levers will tilt the latter and perforce correspondingly raise the lower die. To effect this concerted action of the dies, the upper die is provided near its ends, respectively, with two depending rods 30, that extend freely through perforations in the lower die, which rods are connected at their lower ends by means of a bar 31. Said upper die is held normally elevated by means of springs 32, the lower ends of which rest upon lugs on the sides of the carriage, while their upper ends bear against the outwardly-projecting ends of said die.

Connected by means of a link with the treadle 12$^a$ is a vertically-reciprocative rod 33, that is fitted to suitable guides in the table. To this rod is secured a horizontal bar 34, the ends of which extend over and above the bars of the carriages, respectively, whereby when the treadle is depressed the dies in both carriages are simultaneously operated. When the treadle is released, the dies resume their normally open positions. It will be observed that the position of the bar 34 in relation to the cross-bars 31 is such that there is a slight interval when the treadle is depressed before the bars coact to effect the movement of the dies. Hence when the treadle is depressed the carriages with their adjuncts are moved inward before the normally open dies are closed, as will hereinafter appear.

Supported transversely on the frame midway between the carriages is a trackway 35, the ends of which are preferably extended beyond the front of the machine, as indicated by the dotted lines in Fig. 3. This trackway is adapted to support the devices in which are contained and rotated the glass tubular sections A, from which the vials are to be made. The said sections are disposed at regular intervals apart, the series corresponding in number with the plugs in each carriage. The center of each section is in line horizontally with the centers of the opposite plugs, whereby when the carriages are moved inward said plugs will enter the ends of the opposed sections, respectively.

Although there is more than one way by which the tubular sections may be supported and rotated, I have illustrated in the annexed drawings a construction that I consider to be efficient and desirable for this purpose, as follows:

36 indicates a carriage composed of two plates 37, rigidly connected a suitable distance apart by cross-bars 38. The lower edges of these plates are provided with offsets 39, that are fitted upon the rails of the trackway so that the carriages 36 may be slid upon the latter. The upper edges of these plates are provided with semicircular recesses 39$^a$, which constitute bearings for the respective ends of sleeves 40, in which the blanks are clamped or otherwise securely held. Thus said sleeves with the blanks therein may be rotated. In the present instance the sleeves are provided near their ends with fixed collars 41, which are tapped radially through the sleeves to receive set-screws 42. When the glass sections are introduced to the sleeves, the screws are adjusted to center the respective blanks and clamp them firmly in place. The sleeves, as will be observed, are much shorter than the blanks, so that the ends of the latter will project outward for a purpose to be explained. Each of the sleeves is provided about midway of its length with a pinion 43, which is so proportioned that when the several sleeves are applied to the carriage the successive pinions will be in gear. Hence if one of the pinions be rotated the train, together with the sleeves and their contained blanks, will be rotated in concert. A means which I employ for actuating one of said pinions comprises a pair of coacting spur-wheels 44 45, the driven one, 44, of which may be moved up into operative engagement with one of the end pinions or be disengaged therefrom at will. The driving-wheel 45 is fast on a shaft 46, which is driven from a suitable source of power, this shaft being mounted in bearings in a properly-disposed pedestal 47. The other wheel, 44, is mounted in a swinging frame 48, pivotally connected with said pedestal, which frame is connected by means of a link 49 with a hand-lever 50, that is fulcrumed to the table. The swinging frame, with its wheel, normally gravitates to the position indicated in Fig. 3—namely, below the path of the end pinion; but by the act of depressing the hand-lever the said frame is elevated and the wheel therein engaged with said pinion, as indicated by the dotted lines. This done, the train of gears is set in motion. The sleeves with the sections therein are preferably mounted on the carriage, which latter is then applied to the trackway and run into the machine. If desired, an endless conveyer 51 may be employed to conduct the said carriage into position, this conveyer being provided with a stud 52, which abuts against the rear cross-bar of the carriage and impels the latter to the machine, thereupon escaping said bar and passing rearward for a succeeding operation.

A suitable stop is provided to lock the section-supporting carriage 36 in proper position relative to the plug and die supporting carriages, which stop in the present case comprises a bolt $a$, secured to a spring-actuated thumb-lever $b$, fulcrumed on the inner side of one of the rails of the trackway 35. This bolt is fitted to a perforation in the rail and is normally projected into the latter. That side of the carriage 36 that traverses the perforated rail is provided with a perforated lug $c$, with which the free end of the pin is adapted to register when said carriage is run into the machine. The working end of the pin is beveled to permit its ready retraction by the impact of the lug preparatory to engaging the perforation. By properly manipulating the lever the pin may be retracted to release the cariage.

Two series of blowpipes 53 are arranged at each end of the machine, the nozzles of one series being directed downward and those of the other or lower series being directed upward. The blowpipes of each series are arranged in pairs, the nozzles of each pair being so disposed as to direct the flames in converging lines toward and against the adjacent end of a tubular section. Both ends of each blank are thus acted upon by the flames from the blowpipes, above and below, and hence during the rotation of the several sections their ends, respectively, are uniformly affected by the heat. The blowpipes each comprise the tapering nozzle 54, with the air and gas pipes 56 57, respectively, connected therewith, the air-pipes and gas-pipes of the several series being connected with common feed-pipes 58 and 59, respectively. The pipes 56 57 are each provided with a suitable valve 60, whereby the flow of the fluid therein may be nicely regulated to produce an appropriate flame, while the main pipes 58 and 59 are provided with valves 61, by which the flow of the fluids to the branch pipes may be controlled. The two upper series of pipes are supported by yokes 62, secured to the sides of the frame, while the corresponding lower series are supported by suitably-arranged cross-bars 63. The keys of the valves 61 are provided with arms 64, that are connected by means of a link 65, the latter being in turn connected with the treadle by means of another link 66, to the end that the movement of the treadle will operate said valves. The connections are such that when the treadle is in its raised or normal position the valves 61 are open to permit the passage of air and gas to the blowpipes, yet when the treadle is depressed the valve on the air-pipe 58 is entirely closed to shut off the air-blast, while the valve on the gas-pipe 59 is partially closed to allow only a sufficient flow of gas to support a small flame at each of the nozzles. Each of the air-supply pipes 58 is provided at a suitable point with a normally-closed check-valve 67, the keys of the two valves being connected by a cross-bar $67^a$, and the latter in turn connected with the hand-lever 50 by means of a link 68. The connection is such that when the lever is operated to raise the gear 44 into action the valves 67 are opened to permit the passage of the air-blast to the series of nozzles, but when the lever is released to permit the gear 44 to drop out of action the valves are closed.

Figure 1:
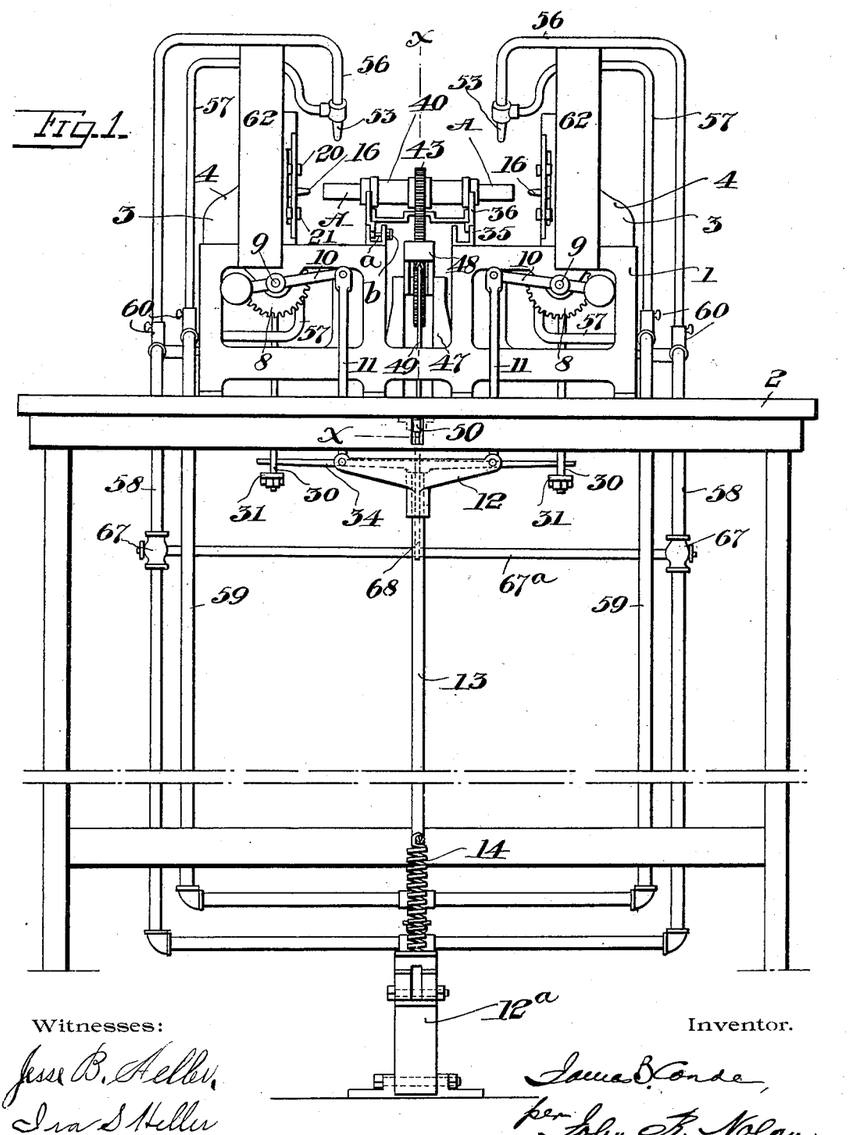
Figure 1 is a side elevation of a machine embodying my invention.
Figure 2:
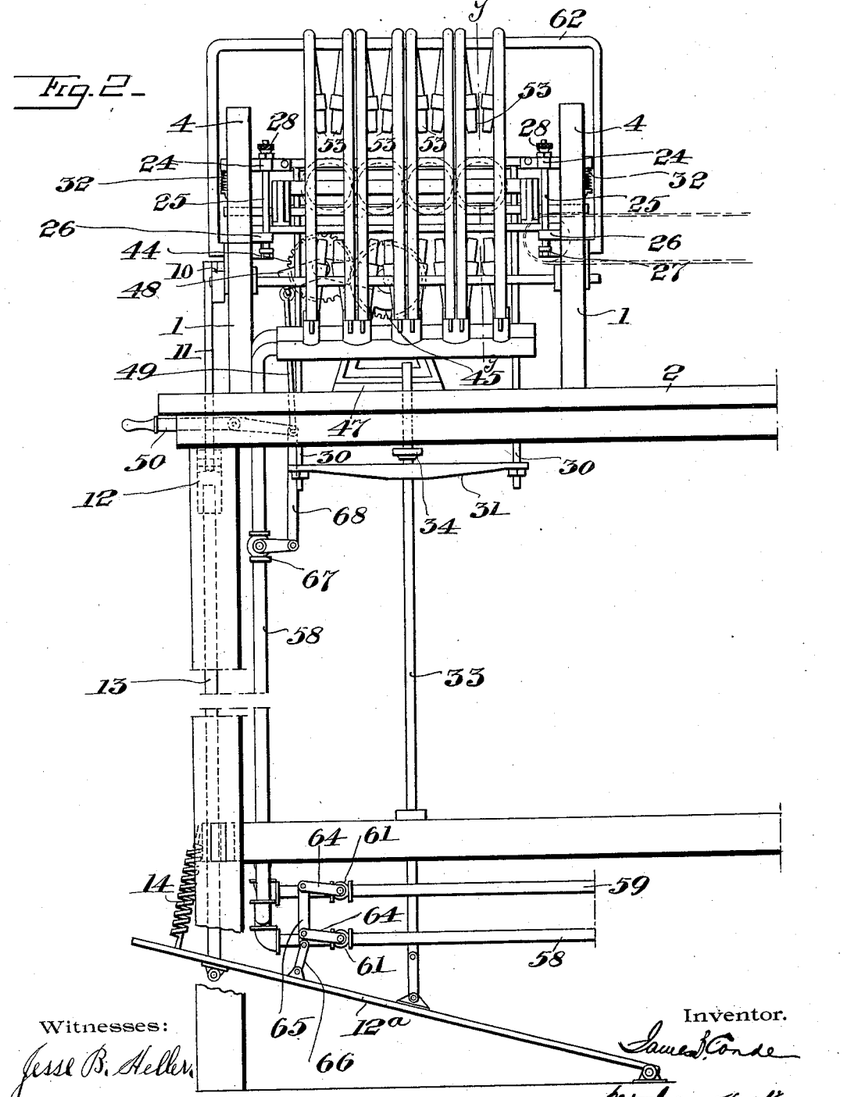
Fig. 2 is an end view thereof.
Figure 4:
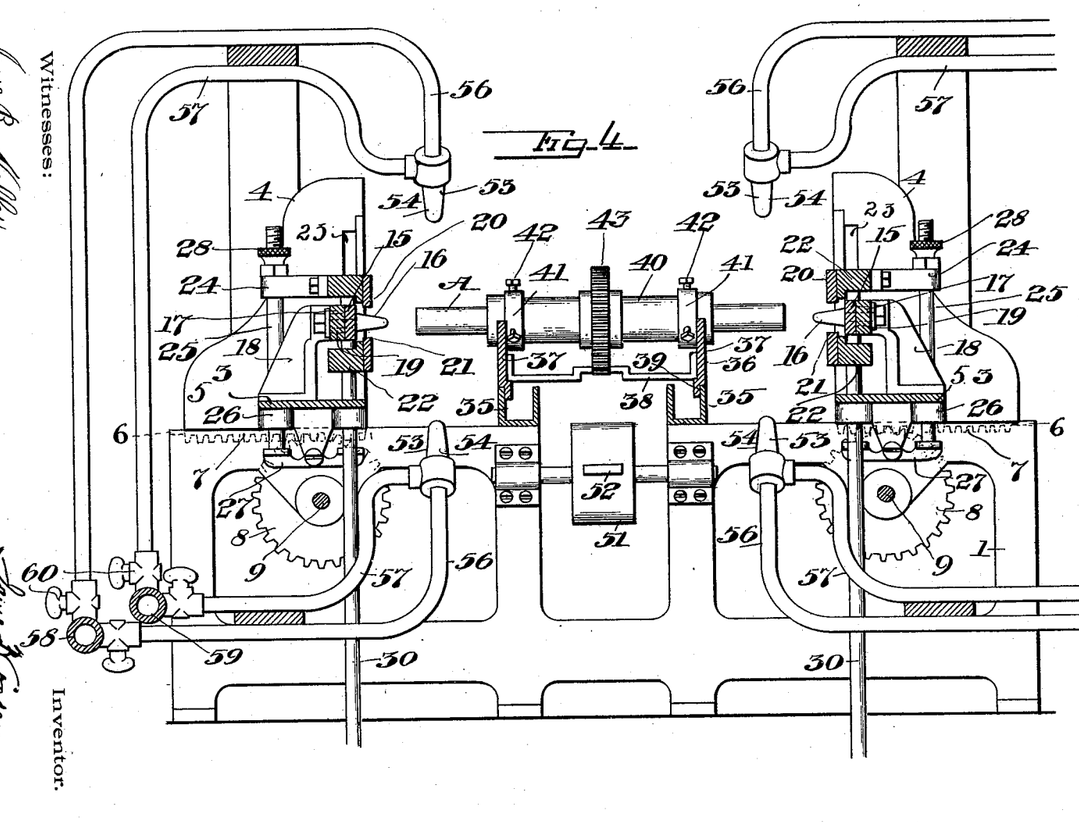
Fig. 4 is a longitudinal vertical section as on the line *y y* of Fig. 2, the plug and die supporting carriages being in their normal or outward position.
Figure 5:
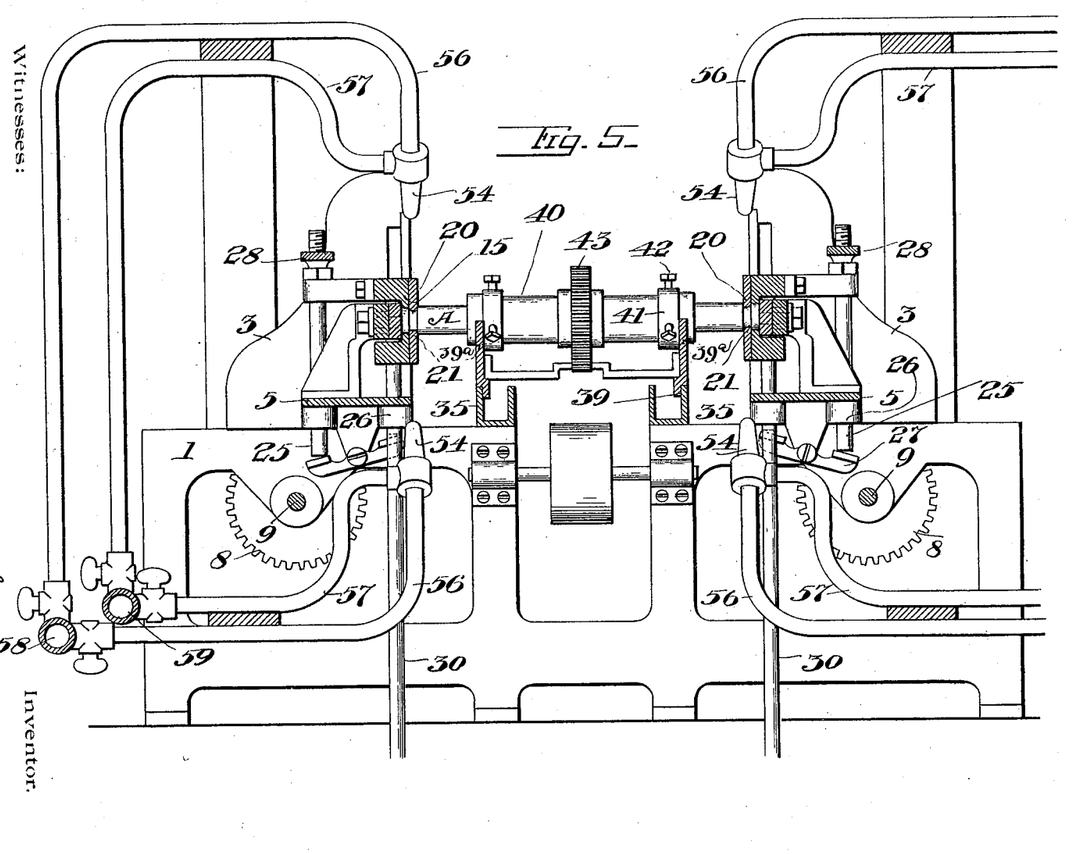
Fig. 5 is a section similar to Fig. 4, showing the said carriages in their inward position with their respective plugs and dies engaged with the opposed ends of the tubular section.
Figure 6:
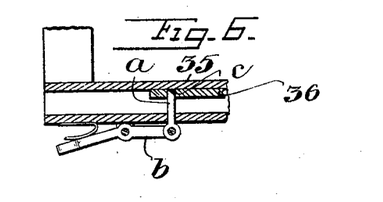
Fig. 6 is a detail section as on the line *z z* of Fig. 3.
Figure 7:
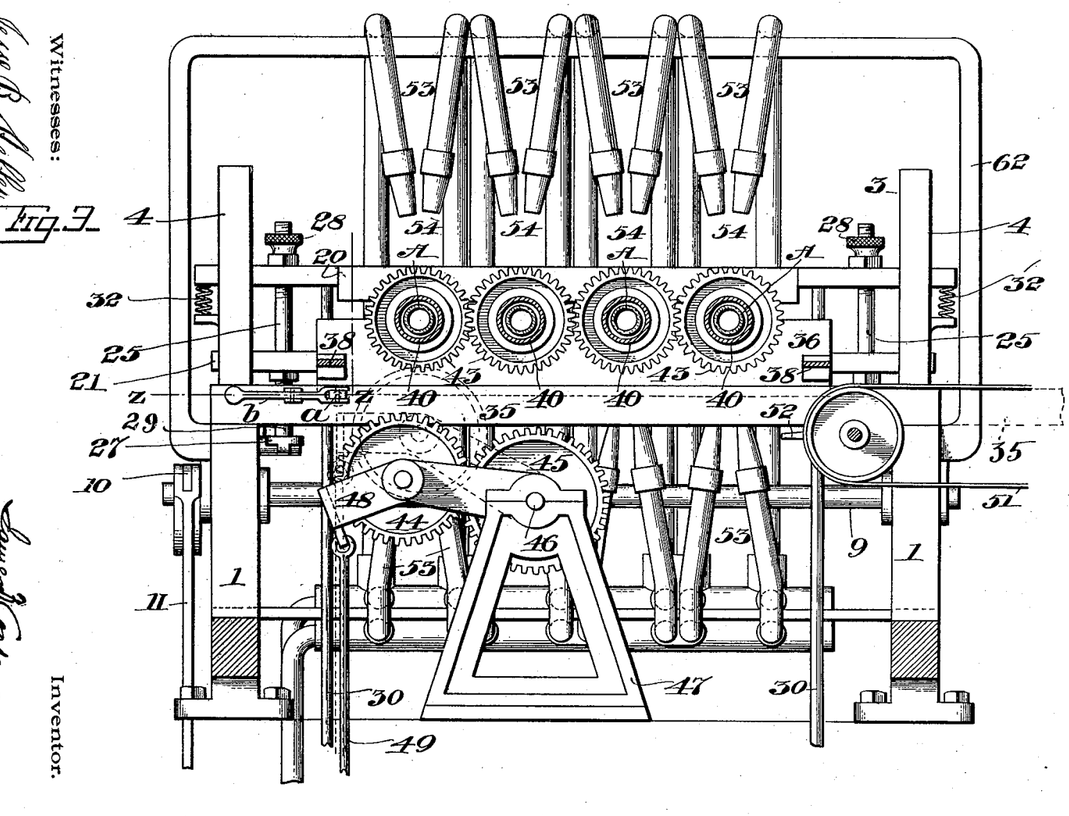
Fig. 7 is a view of one of the glass sections before and after its introduction to the machine.

The operation, briefly described, is as follows: At the outset the glass sections (or blanks) are run into the machine and the lever 50 operated to move the gear 44 into action to effect the rotation of the sections and at the same time to open the valves 67. The gas and air are then turned on and ignited, the blast being directed upon the ends of the rotating sections and maintained thereon until said ends are properly heated. At this stage the operator depresses the treadle. This effects the reduction of the flames, advances the carriages 3 sufficiently inward to insert the plugs in the opposed heated ends of the rotating sections, and then closes the dies upon said ends. As a result of the successive steps a lip and a grooved or contracted neck, as X, Fig. 7, are formed upon each end of the several sections. Upon completing the operation the treadle is released, whereupon the several parts connected therewith resume their normal positions. The gear is then dropped out of operation and the carriage with its double-necked sections removed from the machine. These sections are subsequently divided midway of their length and bottoms or nozzles formed thereon in any approved manner. This done, two vials or two syringes, as the case may be, are produced from each section. Simultaneously with the dropping of the gear 44 out of action the valves 67 shut off the air-blast.

Hence when the carriages are retracted the flames are not blown upon the necks just formed.

I claim—

1. In a machine for necking and lipping vials, &c., the combination, with a tube-support, mechanism for rotating the tube, and heating devices directed to the end of said tube, of a plug, normally open dies, and means for operating said plug and dies in relation to each other and the heated end of the tube, and means whereby the tube is freed from the rotating mechanism.

2. In a machine for necking and lipping vials, &c., the combination, with a tube-support, mechanism for rotating the tube, heating devices directed to the end of said tube, a reciprocative plug, means for reciprocating the same toward and from the heated end of the tube, a pair of normally open dies, means for closing said dies when the plug has been advanced, and means whereby the tube is freed from the rotating mechanism.

3. In a machine for necking and lipping vials, &c., the combination, with a tube-support, mechanism for rotating the tube, heating devices directed to the end of said tube, a carriage movable toward and from the heated end of the tube, a plug and dies on said carriage, means for operating said carriage, means for relatively operating the dies, and means whereby the tube is freed from the rotating mechanism.

4. In a machine for necking and lipping vials, &c., the combination, with a tube-support beyond which both ends of the tube project, means operating intermediate said ends for rotating the tube, heating devices directed to the respective ends of the tube, oppositely-disposed plugs and dies adjacent to said ends, and means for operating said plugs and dies in relation to each other and to the ends of the tube.

5. In a machine for necking and lipping vials, &c., the combination, with a support, a tube-holding gear device, a coacting driving-gear, supporting and actuating mechanism therefor, and means for engaging and disengaging the gears, of a plug, normally open dies, and means for relatively operating said plug and dies, together with heating devices.

6. In a machine for necking and lipping vials, &c., the combination, with a tube-support beyond which both ends of the tube project, a gear device on the body of the tube, intermediate the ends of the latter, a coacting driving-gear, supporting and actuating means therefor, and means for engaging and disengaging the gears, of the heating devices directed to the respective ends of said tube, oppositely-disposed plugs and dies adjacent to said ends, and means for operating said plugs and dies in relation to each other and to the ends of the tube.

7. The combination, with a tube-support, and means for rotating a tube, of a plug, dies, and means for supporting and operating said plug and dies, heating devices, and automatic means for regulating the operation of said devices at predetermined intervals.

8. In a machine for necking and lipping vials, &c., the combination of a tube-support, mechanism for rotating a tube, a reciprocative carriage adjacent to said support, means for reciprocating said carriage, a plug and dies on said carriage, and independent means for operating the dies, together with heating devices directed to the end of said tube.

9. The combination with a hollow holder, means for clamping a tube therein, and means for positively rotating said holder, of a plug, normally open dies, and means for relatively operating said plug and dies, substantially as described.

10. The combination with a hollow holder, means for clamping a tube therein, a gear on said holder, a coacting driving-gear, a plug, normally open dies and means for relatively operating said plug and dies, together with heating devices, substantially as described.

11. The combination with a series of tube-holders, coacting gears on said holders, and a primary driving-gear therefor, of a corresponding series of plugs, normally open dies, and means for relatively operating said plugs and dies, together with heating devices, substantially as described.

12. The combination with a series of tube-holders, clamping-screws therein, coacting gears on said holders, plugs adapted to be projected toward and retracted from said holders, means for operating said plugs, normally open dies between which said plugs extend, and means for operating said dies, together with heating devices, substantially as described.

13. The combination with a tube-support, of a reciprocative carriage adjacent thereto, a plug and dies on said carriage, and independent means for operating the dies, together with heating devices, substantially as described.

14. The combination with tube-supports, of a reciprocative carriage adjacent thereto, fixed plugs on said carriage, normally open dies between which said plugs extend, means for reciprocating the carriage, and means for closing the dies upon the advancement of the carriage toward the tube-supports, together with heating devices, substantially as described.

15. The combination with a series of tube-supports, a carriage therefor, a reciprocative die and plug supporting carriage, means for reciprocating the latter and means for operating the dies, together with heating devices, substantially as described.

16. The combination with a series of tube-supports, a carriage therefor, a lock for said carriage, a reciprocative die and plug supporting carriage, means for reciprocating the latter, means for operating the dies, together with heating devices, substantially as described.

17. The combination with a rotatable tube-support, a blowpipe directed toward the end thereof, a check-valve on said pipe, devices for rotating said support, and a connection between said devices and the check-valve, whereby when said devices are thrown into action the valve is opened, and the converse, substantially as described.

18. The combination with a tube-support, a blowpipe directed thereto, valves on the gas and air supply branches of said blowpipe, dies and plugs, and means for supporting the same and independently operating the same, a common operating device, and connections with the same, the valves, and the die and plug operating devices, substantially as described.

19. The tube-supports, a carriage therefor, a trackway for said carriage, and a conveyer adapted to impel the carriage on the trackway, together with the dies, the plugs and the supporting and operating devices therefor, substantially as described.

In testimony whereof I have hereunto affixed my signature in the presence of two subscribing witnesses.

JAMES B. CONDE.

Witnesses:
JOHN R. NOLAN,
JESSE B. HELLER.